UNITED STATES PATENT OFFICE.

JEGOR ISRAEL BRONN, OF ROMBACH, LORRAINE, GERMANY, ASSIGNOR OF ONE-HALF TO THE FIRM OF ROMBACHER HÜTTENWERKE, OF ROMBACH, GERMANY.

TREATMENT OF COKE-OVEN GASES.

1,211,395. Specification of Letters Patent. Patented Jan. 9, 1917.

No Drawing. Application filed October 14, 1916. Serial No. 125,739.

*To all whom it may concern:*

Be it known that I, JEGOR ISRAEL BRONN, engineer chemist, a citizen of the German Empire, and resident of Rombach, Lorraine, Germany, with the post-office address Gartenstrasse 17, have invented new and useful Improvements in the Treatment of Coke-Oven Gases, of which the following is a specification.

The distillation gases escaping from mineral coal during the coking process (coke oven gases) are, at the present, being utilized by withdrawing the components which may be easily condensed and absorbed or washed out, such as tar, benzene, the nitrogen (ammonia, cyanogen) and the sulfur compounds being recovered as far as possible and the gases escaping from such by-product recuperation, generally termed heating gases, being employed for heating, and also for lighting purposes.

The present invention relates to a more economic method of utilizing the said heating gas, and consists essentially in separating the several components of the said gas termed heating gas more or less thoroughly from each other and utilizing the same in accordance with their physical and chemical properties for producing high temperatures, for chemical synthesis, in aerial navigation, in refrigeration and the like. It has, furthermore, been found that for several purposes it is not necessary to separate the coke oven heating gases into their several individual components, and that their separation into groups of such components will afford greater economic and technical advantages whereby also a reduction of the amount of energy required is obtained.

For separating the several components the gas escaping from the by-product recuperation is highly compressed whereupon the contents of water and carbonic acid as well as the sulfur and nitrogen compounds, if any, are recovered in known manner. The gas which has been thus treated is, thereupon, compressed still further, if necessary, and cooled to such a degree that all components, with exception of hydrogen become liquefied. This may be obtained at a temperature of —150° C. and pressure of 40 atmospheres. After the gas, which now consists of almost pure hydrogen, has been separated from the liquefied components the latter are submitted to a fractional distillation which may be carried out more specifically as the vapor pressures of the respective gases are far apart; so for example the vapor pressure of liquefied nitrogen is approximately 30 atmospheres at —150° C., that of carbonic oxid 20 atmospheres, that of methane 2 atmospheres and that of ethylene only 10 millimeters mercury column. As, however, ethylene is generally present in the heating gas in small quantities only (about 2%) it cannot be recovered according to this method by a single fractional distillation without considerable percentil losses, owing to its being carried along by other gases. Under the said circumstances it is therefore advisable to compress the gas from the recuperation to a pressure of about 40 atmospheres and to send it at this pressure at temperatures of about 0° C. first through vessels containing water or other suitable absorbing substance in order to obtain an absorption of the carbon dioxid; thereupon the gas is sent through a vessel with concentrated solution of common salt, alcohol or acetone, in which the ethylene gas is absorbed; the gas thereupon remaining, which will still be under a sufficient pressure and consists of methane, carbon monoxid, nitrogen and hydrogen, is desiccated and cooled down to about —150° C. Thereby all gases with exception of hydrogen are liquefied so that the said hydrogen may be separated from the other liquefied components. The remaining liquid is then, as hereinbefore described, subjected to fractional distillation. The absorbtion liquids may also be chosen in such a manner, that one liquid, for example, will absorb two different gases; so, for example, certain kinds of alcohol possess a high solvent capacity for carbon dioxid and for ethylene. This property is of particular importance when the respective gases are to subsequently react on each other, as this is the case with the recently suggested oxidization of ethylene by carbon dioxid.

As hereinbefore said, it is advisable to highly compress the gas before it enters the absorbers, so that the gas escaping still unabsorbed remains under a sufficient pressure so that it will be liquefied when reduced to a temperature of —150° C. It might be supposed that in consequence of the contact with the absorbent liquids under very high pressures also such components of the gas, the absorption of which is not desired and which, at ordinary pressures show but moderate solubility in the respective liquids, would be solved to a very considerable extent. In fact, however this supposition will be realized to but a small degree, as hereinafter stated: 1 part of water will, for example absorb at a pressure of one atmosphere and 0° C., 0.22 parts of ethylene. If the gas mixture is exposed to a pressure of 50 atmospheres, the solubility does not rise in proportion to the total pressure, even if the gases should exactly correspond to the Henry-Dalton rule, but only in proportion to their partial pressure; with a gas mixture containing 2% ethylene the partial pressure is, under such conditions, only $$\frac{2}{100} \times 50 = 1 \text{ atmosphere.}$$

The loss in the valuable ethylene gas by the absorption of the carbonic acid by water is, therefore not considerable.

The absorbing liquids which are saturated with the gas at a high pressure and low temperature will, as is known, allow of the absorbed gases escaping, when the pressure is relieved and the temperature rises, whereupon the said liquids may be again employed for charging the absorbers.

For recovering economically valuable gas mixtures from the heating gas, the following procedure is employed: By compressing the coke oven heating gases, while they are being freed of carbon dioxid and other easily condensed and washed out components, at a temperature of about —150° C. to a little above 30 atmospheres pressure, a liquefied mixture of all carbon compounds remaining in the gases (ethylene, methane, carbon monoxid) is obtained, the said mixture also containing a small amount of nitrogen and hydrogen in solution. This liquid will, at the ordinary temperature and if the pressure is partly relieved, change into a highly compressed gas mixture which possesses an extremely high specific lighting, heating and welding power and may be substituted with advantage for oil gas and in many instances also for acetylene gas (auto gas, dissous-gas). The unliquefied part of the gases remaining in this production of "artificial" oil gas and consisting of a mixture of nitrogen and hydrogen may, without being separated into its components, be employed for chemical synthesis, for example for synthesis of ammonia, in which case the expansion pressure may, at least partly, be utilized. If the ratio of the said two gases does not correspond to that stoichiometrically required, the wanting quantity of a component may be supplemented by an addition of the same from other sources. If the gas should contain a surplus of nitrogen, the correction of the ratio may be performed by allowing the cooled and compressed coke oven gases to expand to such a degree that the escaping gas mixture will be composed of equivalent volumes of hydrogen and nitrogen.

Under circumstances it may be desirable to obtain the aforementioned "artificial" oil gas free from carbon oxid, as it will then be non-poisonous and of a still higher caloric value. For this purpose either the liquefied gas mixture of all carbon compounds, after being separated from the unliquefied nitrogen and hydrogen is expanded to such a degree that only the carbon oxid escapes, and the hydrocarbons remain liquid, or, the coke oven heating gases to be treated are freed from their carbon dioxid—and also from their carbon monoxid—by being treated, under pressure, with absorbent liquids, and thereupon compressed at a high reduction of temperature. When the coke oven gases contain only a small percentage of carbon monoxid, this later method (previous absorption of the carbon monoxid) will afford an advantage in so far as the amount of energy and reduction of temperature required will be considerably smaller when the hydrocarbons alone are compressed at a temperature of 100° C. a pressure of two atmospheres will be sufficient.

This method of utilizing the heating gas escaping from the recuperation of the by-products may influence the carrying out of the coke oven processes in different ways. In many instances it may be found more economic to heat the coke ovens, as has already been suggested, partly at least, with adventitious gas (producer gas, water gas, furnace gas) so as to allow of utilizing the more valuable coke oven gas in the manner hereinbefore described. On the other hand it may be found advisable in many instances to collect the distillation gases escaping at the various phases of the coking process, separately and to treat the single fractions according to their composition after the present method.

Now what I claim and desire to secure by Letters Patent is the following:

The method of producing from previously treated coke oven gases, a compressed lighting, heating and welding gas, consisting in passing the gas through a substance capable of absorbing $CO_2$, then through a substance capable of absorbing $C_2H_4$, and then liquefying the remaining gases with the exception of hydrogen and nitrogen.

In testimony that I claim the foregoing as my invention, I have signed my name in presence of two witnesses this 2 day of September, 1916.

JEGOR ISRAEL BRONN.

Witnesses:
IDA ALTMANN-BRONN,
JULIUS LANZENBERG.